: 3,540,118
Patented Nov. 17, 1970

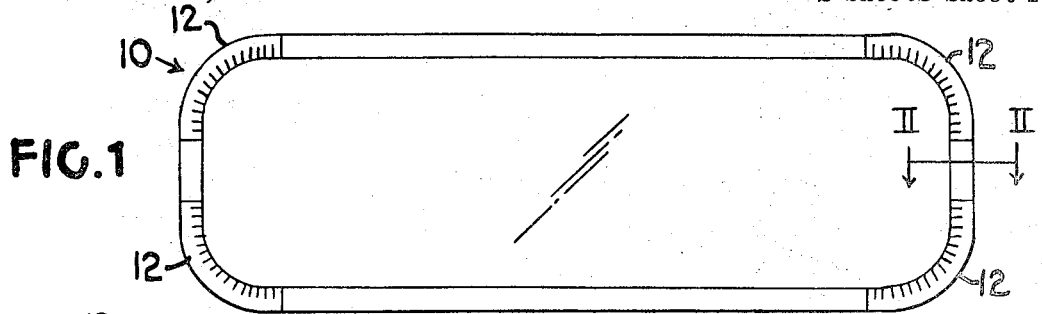
FIG. 1
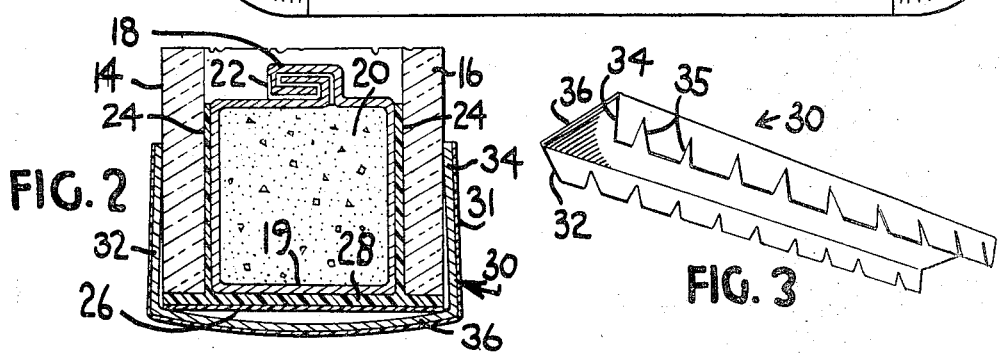
FIG. 2
FIG. 3
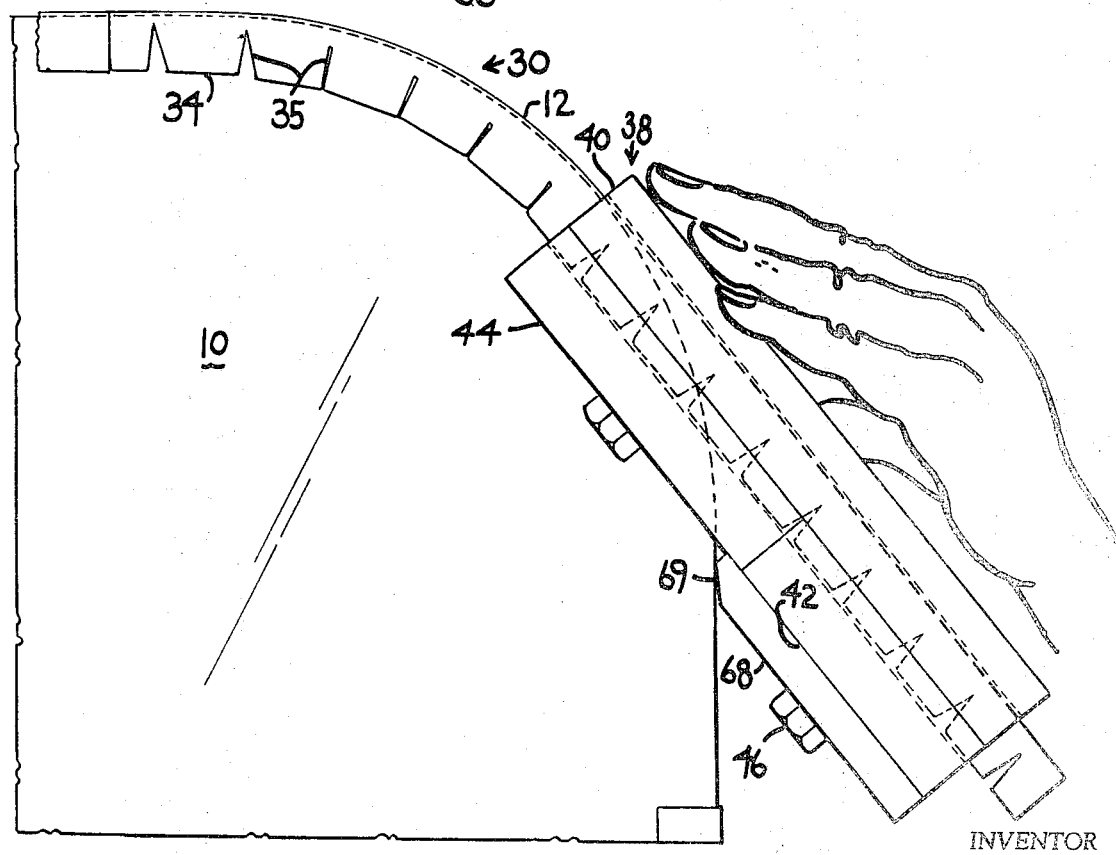
FIG. 4
INVENTOR
THOMAS H. HUGHES

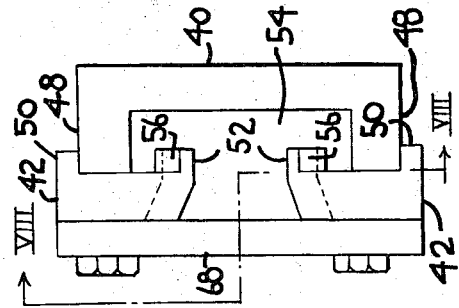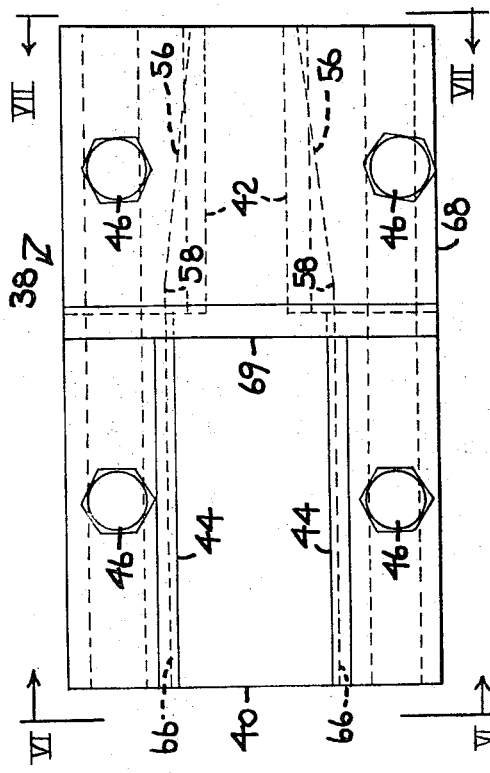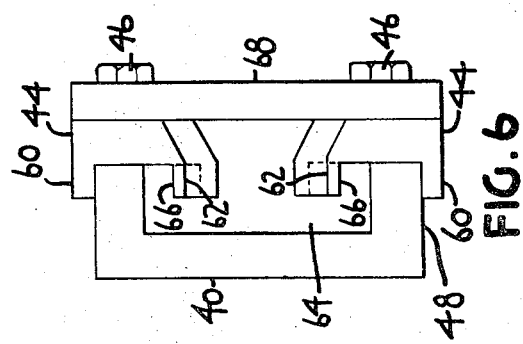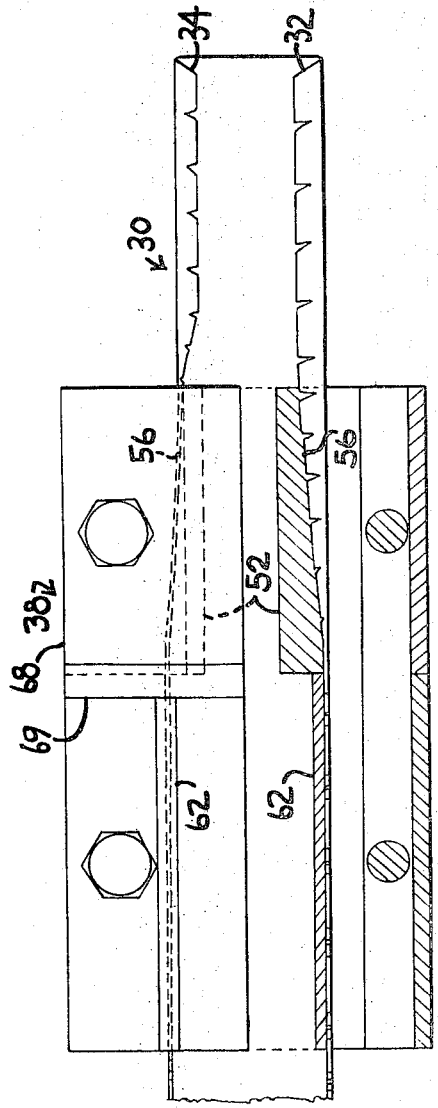

3,540,118
METHOD OF FRAMING A MULTIPLE GLAZED UNIT
Thomas H. Hughes, Sarver, Pa., assignor to PPG Industries, Inc., Pittsburgh, Pa., a corporation of Pennsylvania
Filed Feb. 20, 1968, Ser. No. 706,896
Int. Cl. B23p *11/02*
U.S. Cl. 29—450      5 Claims

ABSTRACT OF THE DISCLOSURE

A method and apparatus for placing a channel member in clamping relation about curved, peripheral edge portions of a multiple glazed unit. A channel member having both flanges notched at essentially evenly spaced intervals is inserted into a flange spreading tool, a portion of the spreading tool and the channel is superimposed over a curved peripheral edge portion of a multiple glazed unit and the channel member is released from the tool into clamping engagement with the curved edge portion of the unit.

BACKGROUND OF THE INVENTION

This invention relates to window construction and, more specifically, to the construction of "pattern" multiple glazed window units. In particular, the present invention relates to a method and apparatus for placing an essentially U-shaped channel member in clamping relation about curved peripheral edge portions of "pattern" multiple glazed units.

A "pattern" multiple glazed unit, as the term is used herein, is intended to mean a multiple glazed structure having at least one curved or non-linear peripheral edge portion. This type of unit is frequently desired for glazing non-rectangular fenestrations in churches, office buildings, public vehicles and the like. It will, of course, be understood that pattern units within the contemplation of this invention may also have linear peripheral edge portions in addition to curved or non-linear peripheral edge portions. Also, it will be appreciated that when reference is made hereinafter to pattern-cut sheets and pattern-cut, pattern-bent or pattern-formed members, it is intended to mean a structure having at least one curved or non-linear portion forming a part thereof.

Multiple glazed units generally comprise two or more sheets of glass spaced from one another to provide an insulating air space between the sheets. This air space is effective for reducing the passage of heat through the unit due to conduction and convection. The sheets of glass are spaced from each other by a marginal edge spacing element extending around the periphery of the glass sheets. The glass sheets are generally adhered to the spacer element by a mastic composition forming a continuous film around the edges of the sheets, between each sheet and the spacing element, to provide a hermetic seal. The spacing elements are generally tubular in shape and filled with a desiccant. Openings in the spacing element communicate between the air space of the unit and the inside, tubular portion of the element so that moisture from the air within the unit will be adsorbed by the desiccant. A resilient, moisture-resistant strip with a layer of mastic adhered thereto is preferably placed about the peripheral edges of the glass sheets and the spacer element. A channel member of substantially U-shaped cross-section is also preferably affixed around the periphery of the unit to protect the peripheral edges of the glass sheets forming the unit.

One conventional method of assembling multiple glazed units as above described is to apply a layer or bead of mastic along two opposite sides of a metal spacing element, which sides are adapted to engage the inner surfaces of the glass sheets about the marginal edges. The spacing element is then placed between two precut glass sheets, and the sheets are pressed together to adhere the sheets to the spacing element and to seal the internal air space between the sheets from the atmosphere. The final air space between the two glass sheets is a function of the thickness of the spacing element and the thickness of the mastic layers between each side of the spacing element and the adjacent glass sheet. A channel member made of metal, such as stainless steel, is then affixed around the periphery of the unit. The angle that the flanges or sides of the channel member forms with the central or web portion of the channel member is slightly less than 90 degrees. When the channel member is affixed to the edges of the glass sheets, these sides are held apart to allow the glass to be inserted therebetween. The sides are then released and they spring back into contact with the faces of the glass sheets. The channel members are thus held on under tension.

In the manufacture of pattern multiple glazed units such as are contemplated by the present invention, the precut glass sheets have matching non-linear or curved peripheral edge portions and the metal, marginal edge spacing element is pattern bent or pattern formed to conform in shape to the perimetrical contour of the pattern-cut glass sheets. The pattern bending of the spacing element is a relatively simple operation because it merely involves stretching or elongating the metal or other ductile material of which it is composed about a surface of the desired radius or contour. However, pattern bending the U-shaped channel member would involve a considerably more difficult operation requiring the use of expensive, custom equipment. Accordingly, in the past it has been the practice to use a straight channel member having both flanges V-notched at essentially evenly spaced intervals so that, regardless of the curvature, the required expansion or compression of the material of the flanges is accommodated by relative opening or closing of the V-shaped notch.

Notwithstanding the use of notched channel members it has been found difficult to place the notched channel member onto the curved peripheral edge portions of the pattern unit. In the past, this task has been accomplished by placing the interior facing surface of a portion of the free end of one flange of the channel member in abutting relation with a marginal edge portion of the outer major surface of one of the glass sheets and then, by the use of a thin-bladed knife or similar tool, exerting a combination of leverage and wedging action on the other flange and hand pressure against the web of the channel member to force that portion of the channel member over a curved portion of the pattern unit. This operation was repeated over and over as succeeding portions of the channel member were progressively placed around the curved portion of the unit. As will be apparent, this was an extremely tedious and time-consuming operation. Accordingly, the present invention is directed toward ameliorating the above-mentioned difficult task of placing a channel member about curved, peripheral edge portions of a pattern multiple glazed unit.

These and other objects, features and advantages of the present invention will become more apparent from that which follows when taken in conjunction with the drawings, in which:

FIG. 1 is a plan view of a relatively simple pattern multiple glazed unit within the contemplation of the present invention.

FIG. 2 is a typical cross-section along the line II—II of FIG. 1 showing details of the construction of the multiple glazed unit.

FIG. 3 is a perspective view of a short length of the channel member used in conjunction with the present invention.

FIG. 4 is a fragmentary enlarged view of one curved corner portion of the multiple glazed unit of FIG. 1, along with a plan view of a tool comprising a preferred embodiment of this invention. The tool, channel member and corner portion of the pattern unit are shown as they would normally appear while placing a channel member about the curved corner of the unit.

FIG. 5 is a bottom view of the tool of FIG. 4 showing additional details of its construction.

FIG. 6 is a side view of the tool of FIG. 4 along the line VI—VI of FIG. 5 showing further details of its construction.

FIG. 7 is a side view of the tool of FIG. 4 along the line VII—VII of FIG. 5 showing still further details of its construction.

In the drawings, and with particular reference to FIGS. 1 through 3, there is shown a multiple glazed unit 10 having curved peripheral edge portions 12. The multiple glazed unit 10 is comprised of two sheets of glass 14 and 16 arranged in parallel relationship. The glass may be tempered, colored, laminated or have other special strength or optical properties. The glass sheets are separated at their marginal edges by a continuous metal spacer element 18, such as disclosed in U.S. Pat. No. 2,684,266. The spacer element includes a tubular portion of generally rectangular cross-section that is filled with a desiccant 20. An example of a suitable desiccant is granular or powdered silica gel. Communication between the air space between the glass sheets 14 and 16 and the desiccant 20 is provided through a plurality of channels or passages 22 in spacer element 18. The spacer element 18 extends completely around the unit 10 and between the marginal edges of the glass sheets.

The spacer element 18 is adhered to the glass sheets 14 and 16 at their inner faces by means of a thin, continuous film of an adhesive, moisture-resistant mastic composition 24, such as disclosed in U.S. Pat. Nos. 2,974,377 and 3,076,777. In addition, a resilient, moisture-resistant strip 26 with a layer of mastic 28 adhered thereto, such as disclosed in U.S. Pat. No. 2,974,377, is bonded to the peripheral edge or flat side 19 of spacer element 18 and the peripheral edges of the glass sheets. Strip 26 and mastic 28 extend completely around the perimeter of the unit. A channel member 30 of essentially U-shaped cross-section also extends completely around the perimeter of the unit to protect its edges. Channel member 30 is generally comprised of several sections of channeling that are joined or butted together at their ends. Where desired, a strip of adhesive tape 31 is applied in longitudinal, surrounding relation with the outer surfaces of the channel member 30.

Channel member 30, as aforesaid, has an essentially U-shaped cross-section. However, where channel member 30 has to be placed about a curved peripheral portion of the multiple glazed unit 10, such as at corner portion 12, both of the flanges 32 and 34 extending from the web 36 therof are provided with V-shaped notches 35 at essentially evenly spaced intervals to permit readily conforming the channel 30 to the curved portion of the unit. The angle that the flanges or sides 32 and 34 of the channel member forms with the central or web portion 36 is slightly less than 90 degrees. Relative opening or closing of the V-shaped notches 35 permits readily conforming the channel 30 to the precut or pattern-cut curvature of the glass sheets.

Shown in FIGS. 4-8 is a perffered embodiment of a framing machine or tool 38 of the present invention that can be advantageously employed to place a channel member 30, having both flanges 32 and 34 notched at essentially evenly spaced intervals, in clamping relation about curved, peripheral edge portion 12 of multiple glazed unit 10. Framing machine 38 is essentially comprised of a downwardly open channel-shaped tool holder 40, a pair of spreader or wedging tool members 42 and a pair of jaw tool members 44.

The spreader members 42 extend forwardly from the rear or trailing end of the channel-shaped holder 40 and are securely mounted as by means of bolts 46 to the free ends of tool holder flanges or legs 48. In the embodiment shown, each spreader member 42 is an upwardly open channel-shaped member having a leg 50 mounted adjacent the outer surface of a leg 48 of the tool holder 40, with the adjacent web portion of spreader 42 lying immediately subjacent the free end of the leg 48. Legs 52 of spreader members 42 are spaced inwardly from the respective inner surfaces of the legs 48 of the tool holder 40 to provide an essentially channel-shaped opening or hollow 54 between tool holder 40 and spreader members 42. Although not essential for the practice of the present invention, in the embodiment shown legs 52 of spreader members 42 are laterally spaced from each other to provide a space therebetween. The inner surface 56 of leg 52 of each spreader member 42 is a vertical, inclined surface for essentially its entire length, and terminates in a short surface portion 58 that is parallel to the inner surface of the adjacent leg 48. In the installed or mounted position of spreader members 42, these inclined surfaces 56 diverge outwardly from each other in a direction toward the front or leading end of the tool holder 40 and the framing machine 38.

The jaw members 44, as shown, extend forwardly from the forward ends of the spreader members 42 and are mounted as by means of bolts 46 immediately adjacent thereto and to the free ends of tool holder legs 48. Like spreader member 42, jaw member 44 is an upwardly open channel-shaped member having a leg 60 mounted adjacent the outer surface of a leg 48 of the tool holder 40, with the adjacent web portion of jaw member 44 lying immediately subjacent the free end of the leg 48. Legs 62 of jaw members 44 are spaced inwardly from the respective inner surfaces of the legs 48 of the tool holder 40 to provide an essentially channel-shaped opening or hollow 64 between tool holder 40 and jaw members 44. Opening or hollow 64 corresponds in shape and size to the forward terminal end of opening or hollow 54 between tool holder 40 and spreader members 42. Legs 62 of jaw members 44 are laterally spaced from each other to provide means to permit positioning at least a portion of the jaw members and a portion of a channel member 30 carried in opening 64 in clamping relation about the curved peripheral edge portion 12 of multiple glazed unit 10. The inner surface 66 of leg 62 of each jaw member 44 is coplanar with the surface portion 58 of spreader member 42. Jaw members 44 terminate at the front or leading end of tool holder 40, leaving the forward terminal end of opening 64 unrestricted. This unrestricted opening or hollow provides means that permits progressively releasing a channel member carried in opening 64 and opening 54 into clamping engagement with the curved peripheral edge portion 12 of multiple glazed unit 10.

When desired, in order to protect the edges of the glass sheets 14 and 16, a wear-piece or bearing member 68 may be affixed to the bottom surface of framing machine 38. In the embodiment shown, wear-piece 68 covers the rear portions of the bottom surface of framing machine 38 and terminates in a rearwardly inclined wear-surface 69 slightly forward of the forward terminal end of spreader members 42. This wear-surface rides on the edges of the glass sheets as the framing machine is moved relative thereto.

As best shown in FIGS. 4 and 8, in the practice of the present invention a segment of the notched channel member 30 is inserted into channel-shaped opening 54 from the trailing end of framing machine 38. The flanges 32 and 34 of channel member 30 are spread by the inclined surfaces 56 as the channel member is progressively inserted into framing machine 38. As each successive portion of the channel member 30 reaches the forward end of spreaders 42, it achieves its fully spread position and is thereafter maintained in this spread position while in the framing machine 38 by legs 62 of jaw members 44. The leading end of framing machine 38 is then placed over a peripheral edge portion of multiple glazed unit 10 so that this selected portion of the unit is received within the space provided between legs 62 of jaw members 44. In this thus superimposed position, the channel member 30 is progressively released from the forward end of framing machine 38 as the framing machine is moved generally from left to right, as shown in FIG. 4, along the peripheral edge of the unit 10 and following the contour of the pattern-cut glass sheets. As the channel member 30 is released from framing machine 38, the flanges thereof relax or spring back toward their original position and into clamping engagement with the curved peripheral edge portion 12 of unit 10. As aforesaid, a piece of adhesive tape 31 may thereafter be placed in longitudinal, surrounding relation with the outer surfaces of the channel member 30.

While the preferred embodiment of this invention has been illustrated and described, it will be understood that various changes and modifications in the procedural steps, as well as in the materials, shapes, arrangement of parts and components, within the range of equivalents of those specifically mentioned, may be made within the scope of the appended claims without departing from the spirit of the invention.

I claim:
1. A method for placing a channel member in clamping relation about curved, peripheral edge portions of a multiple glazed unit comprising providing a resilient channel member having both flanges normally biased towards each other and notched at essentially evenly spaced intervals, inserting said channel member into a flange spreading tool, superimposing a portion of said spreading tool and said channel member about a curved, peripheral edge portion of a multiple glazed unit, and releasing said channel member from said tool into clamping engagement with said curved, peripheral edge portion of said multiple glazed unit.

2. The method of claim 1 which further includes the steps of maintaining a portion of said channel member in fixed, clamping engagement with a peripheral edge portion of said multiple glazed unit and effecting relative movement between the spreading tool and the multiple glazed unit to release said channel member from said tool into clamping engagement with said multiple glazed unit.

3. The method of claim 2 wherein the spreading tool is moved and the multiple glazed unit is held stationary.

4. The method of claim 2 wherein the multiple glazed unit is moved and the spreading tool is held stationary.

5. The method of claim 3 which further includes the step of applying a strip of adhesive tape in longitudinal, surrounding relation with the outer surfaces of said channel member.

References Cited

UNITED STATES PATENTS

| | | | |
|---|---|---|---|
| 397,524 | 2/1889 | Strang | 29—33.52 |
| 3,168,917 | 2/1965 | Bartels | 29—509 X |
| 3,319,708 | 5/1967 | Nelson. | |
| 1,556,234 | 10/1925 | Maise | 29—235 |
| 2,635,332 | 4/1953 | Huntington | 29—235 |
| 2,670,531 | 3/1954 | Mackey | 29—235 XR |

CHARLIE T. MOON, Primary Examiner

U.S. Cl. X.R.

29—235

FO-1050
(5/69)

UNITED STATES PATENT OFFICE
CERTIFICATE OF CORRECTION

Patent No. 3,540,118     Dated November 17, 1970

Inventor(s) Thomas H. Hughes

It is certified that error appears in the above-identified patent and that said Letters Patent are hereby corrected as shown below:

In the drawings, Sheets 1 and 2, the inventor's name reading "HUGEES" should read --HUGHES--.

Signed and sealed this 26th day of October 1971.

(SEAL)
Attest:

EDWARD M.FLETCHER,JR.     ROBERT GOTTSCHALK
Attesting Officer     Acting Commissioner of Patents